(12) United States Patent
Harris (10) Patent No.: US 7,263,494 B1
(45) Date of Patent: Aug. 28, 2007

(54) GRAPHICAL TRAVEL SYSTEM FOR THE INTERNET

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 503 days.

(21) Appl. No.: 09/514,053

(22) Filed: Feb. 25, 2000

(51) Int. Cl.
*G06Q 10/00* (2006.01)

(52) U.S. Cl. ............................. 705/5; 709/224; 235/384
(58) Field of Classification Search .................... 705/5; 701/201; 345/156, 146, 763, 715; 709/224; 235/384
See application file for complete search history.

(56) References Cited

U.S. PATENT DOCUMENTS

| 5,948,040 | A | * | 9/1999 | DeLorme et al. | 701/201 |
| 6,085,976 | A | * | 7/2000 | Sehr | 235/384 |
| 6,088,649 | A | * | 7/2000 | Kadaba et al. | 701/201 |
| 6,148,260 | A | * | 11/2000 | Musk et al. | 701/200 |
| 6,307,572 | B1 | * | 10/2001 | DeMarcken et al. | 345/763 |
| 6,353,794 | B1 | * | 3/2002 | Davis et al. | 701/201 |
| 6,360,205 | B1 | * | 3/2002 | Iyengar et al. | 705/5 |
| 6,526,351 | B2 | * | 2/2003 | Whitham | 701/211 |
| 6,578,078 | B1 | * | 6/2003 | Smith et al. | 709/224 |
| 6,606,101 | B1 | * | 8/2003 | Malamud et al. | 345/715 |

FOREIGN PATENT DOCUMENTS

EP     785537 A1 *  7/1997

OTHER PUBLICATIONS

Michelle Johnson, Finding free transportation-related stuff online > Freetrip.com, Oct. 7, 1999, Boston Globe, p. H. 3.*

* cited by examiner

*Primary Examiner*—Joseph Thomas
*Assistant Examiner*—Robert Morgan (57) ABSTRACT

A graphical user interface for a travel system allows the beginning and end points to be selected, and then displays a line indicating the travel, and calculates fares.

14 Claims, 6 Drawing Sheets

GRAPHICAL TRAVEL SYSTEM FOR THE INTERNET

BACKGROUND

Organized travel systems often have multiple different fares for allowing travel from point A to point B. The major airlines have literally thousands of different fares; each with certain restrictions and certain requirements. Moreover, each different airline may charge a different amount for the same trip.

Many internet travel systems store a database with each of the different fares available from each of the different airlines. The lowest fare can be found by searching each of these multiple records. With a high-power computer, the thousands of different fares can be searched relatively efficiently.

SUMMARY

The present application teaches a way of setting travel plans over a remote information server such as the Internet, using a graphical interface.

BRIEF DESCRIPTION OF THE DRAWINGS

These and other aspects will now be described in detail with reference to the accompanying drawings, wherein.

DETAILED DESCRIPTION

According to one aspect of this disclosure, the user's route is selected using a graphical user interface. The user can select a radius within which their route can begin or end. The user can also select their desired travel dates using a graphical interface. The user can also select a range within which their travel can begin and end. The travel system uses the information entered via this user interface to display the best fares.

Figure 1:
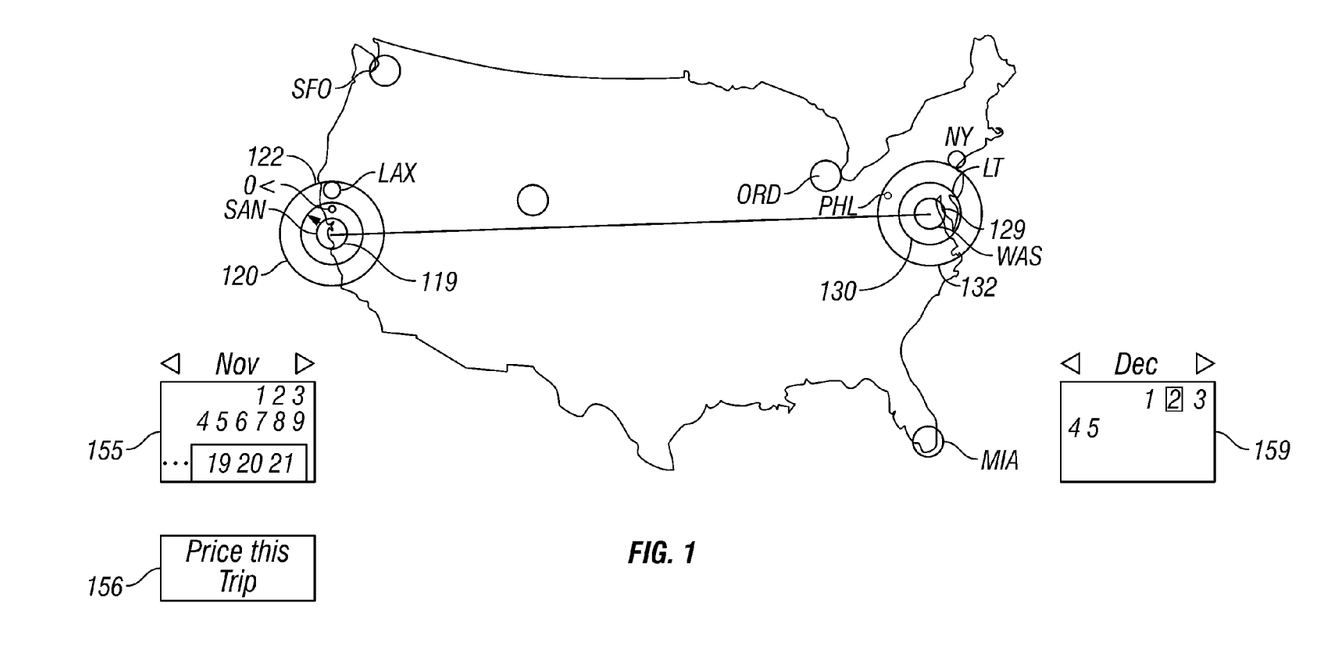
FIG. 1 shows a block diagram of the graphical user interface used to select a trip.
Figure 1B:
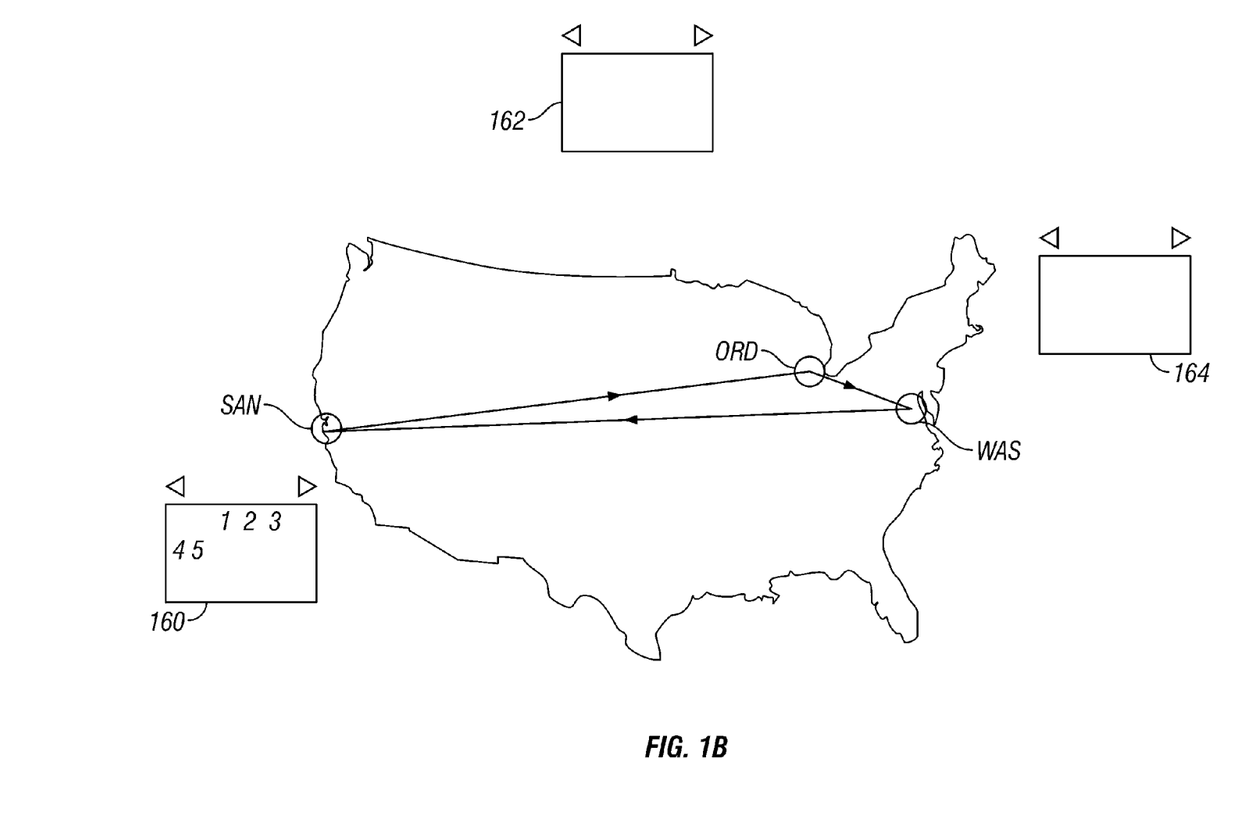
FIG. 1B shows a display of a trip and a line representing stopovers.
Figure 1C:
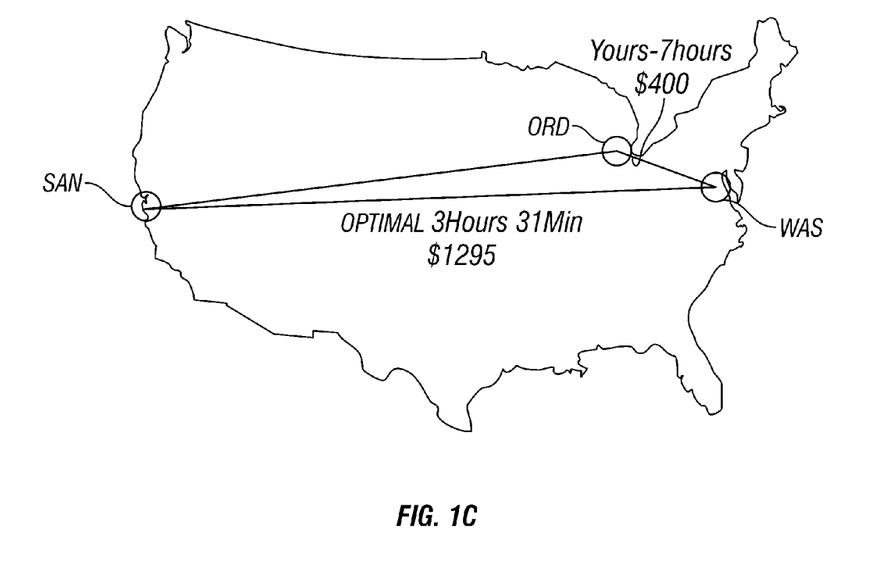
FIG. 1C shows a display of trip versus optimal trip.

The user's actual travel route can be displayed as compared with the optimum route as shown in FIG. 1C. In this way, the user can see how far out of the way the connections will actually take them. A graph showing the user's connections as compared with best worst and other connections can also be displayed. The display can also display prices and times for the other routes.

According to another aspect, this system also allows selecting alternative forms of travel. For example, for a trip from New York to San Diego, one acceptable form of travel could be a flight to a Los Angeles and bus rental car or train to San Diego. The entire travel package is secured for the one price.

A user's login and travel profile is stored as a function of their biometric information. For example, the user's left thumb print is used as an identification of the user. In this way, any user can use any one of a number of different remote terminals. The user's profile can be stored in a central computer, and retrieved from that central computer responsive to recognition of the biometric information. This prevents the user from entering their data each time they log on to a new system. One aspect of the invention couples this with a personal identification number known only to the user. The personal identification number can be entered via a keyboard, or can actually be a sequence of different biometric parts.

The present application describes operations that are carried out over a remote information server such as the Internet.

Figure 5:
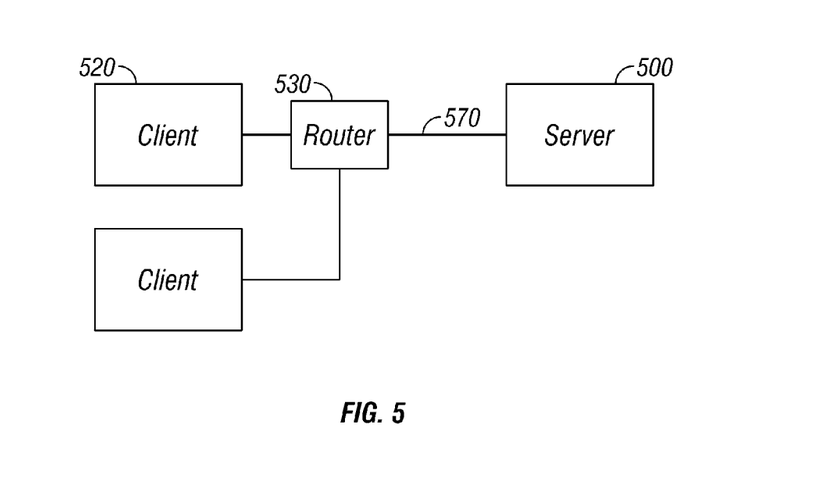
FIG. 5 shows a basic network architecture.

The basic hardware forming the basic setup of the present invention has is shown in FIG. 5. A server computer 500, at a central location, stores a database of information, as well as a user interface program, and a main program which can run a network interfacing program, such as a web browser. The server computer 500 is connected to a network 510, which connects the server 500 to a plurality of client computers. The network can be the Internet, or can be any other network that allows an exchange of information. For example, in one embodiment, the network 510 may be a dedicated dial-up or LAN network. The network comprises at least an information line, and a router 530. The information line 510 can be a telephone line and the router 530 can include the internet backbone, for example. The server computer 500 runs the routines that are described herein.

Many client computers can be connected to the server. Client 520 is shown at a remote location.

The client computer can be any computer which is capable of running a network interfacing program such as a web browser. In addition, the client computer can have various peripherals attached thereto. These peripherals can include, for example, a camera.

In operation, each of the client computers is driven to run the specified routine under control of the server 100.

The specified routines run by both the client and server computers are shown herein. It should be understood, however, that multiple client computers could simultaneously operate. When this happens, this client part of the routine may have multiple clients requesting information from the same server. Any multitasking system can be used to handle these requests.

The functions described herein can be effected in any coding system, including HTML, Java, or C++. The code that is produced is then displayed on a user's remote ("client") terminal. In this embodiment, the image on the client terminal provides a graphical user interface from which trip selections are selected.

FIG. 1 shows a view of the graphical user interface of the main menu of this system. Preferably, each of the views are stored in the server and downloaded to the client computer in the background, and stored in the client computer's cache, to reduce any delays attributable to loading.

In operation, the user on a client first logs into the server, either using a standard login technique, or by using one of the specialized techniques described in the later embodiments. After logging into the server, the user may be provided with a list of options which can include "book a passage", "book a hotel", etc.

FIG. 1A shows an image of the entire United States that is loaded as the main screen, relative to selecting the "book a passage". This main screen can be displayed in relatively low resolution, since it will be used to create the virtual environment of the flight. This image will be used for booking a flight within the United States. However, the main screen could encompass a desired geographical area.

The image is a hyperlinked image. The major geographical areas on the image are shown as being identified. Here, these locations include Los Angeles, San Francisco, Chicago, New York, Washington D.C., Miami, and Denver. The screen shows the airport abbreviations. Also, when the user places their cursor over a part of the image, a screen tip appears indicating more details about the area based on the hyperlink that would be selected if that area of the screen was selected.

Therefore, in areas like Texas, the user may place their cursor over a portion of Texas. The screen tip "Dallas Metro Area" appears. Clicking that area can select Dallas Metro Airport.

Figure 2:
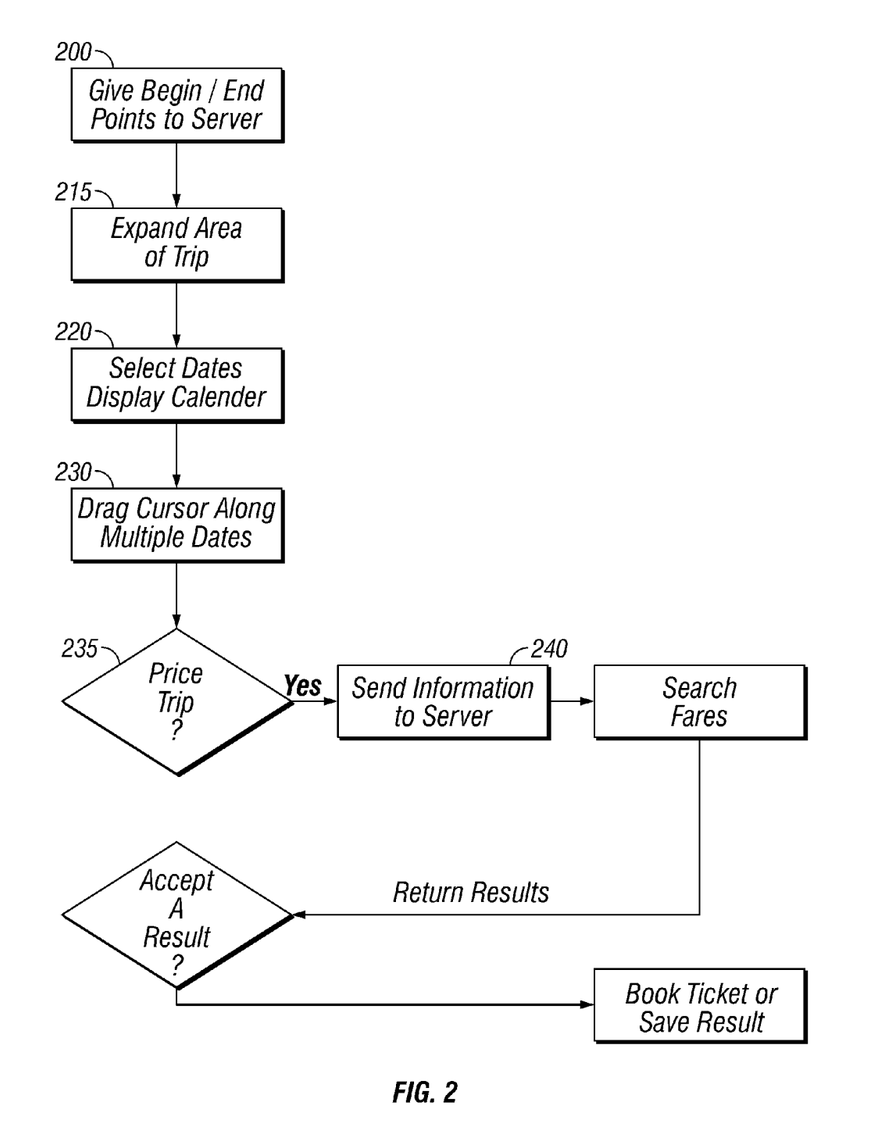
FIG. 2 shows a flowchart of operation.

To plan a trip, the user first clicks on a location of their approximate starting point, and then the approximate end point. The beginning point 119 and end points 129 are communicated to the remote information server computer at step 200. The remote information server forms an image of a line between those points. This is illustrated in FIG. 1, showing a straight line between San Diego and Washington D.C.

Next, at step 215, the user can expand the allowable geographical area. For example, the part at the San Diego end can be expanded to a larger variable radius. The outer radius 120, as shown in FIG. 1 incorporates not only San Diego airport, but also Carlsbad, and Orange County. The even larger outer radius 122 encompasses Los Angeles airport. At the ending point, the user can pull the circle wide enough to incorporate Baltimore (radius 130), or even wider to include Richmond and Philadelphia (radius 132). This expansion of markets operation step is of course optional—alternately the user can use the specific geographical markets that the user has selected.

At step 220, the user selects dates. A first departure calendar 155 is displayed near the point of origin. Another return calendar 159 is displayed near the destination.

Analogously, for multiple destination trips, the system displays multiple lines for the flight legs as shown in FIG. 1B, and multiple calendars 160, 162, 164. The user selects dates from each of the calendars. The server highlights those dates on the respective calendars.

At step 230, the user can also drag the cursor along multiple dates on the calendars to provide a range of dates. For example, the range in FIG. 1A shows departing between November 19 and 21, each of which are illustrated as highlighted on the calendar.

When the routes and dates are completed, the user executes the operation by actuating the "Price this Trip" button 156. At 235, the "price trip" is detected, and the selected parameters are then sent to the server computer over the remote information connection at 240. Those parameters can include identification of the starting point, including each airport within the radius selected, each of the possible start dates, and analogous information for each of the destinations. Each of the combinations from the possibilities is arranged into a matrix form, so that each of the groups of possibilities can be formed. The server computer searches fares on each of the multiple permutations of the items in the set at 245. The results can be sorted by any desired criteria, e.g. by airline, by best price, by most direct route, or by shortest flight time.

The user can select any one of these flights and request purchase of the flight. Once purchased, the flight is stored in an itinerary, as conventional in an Internet based travel agent.

A second mode of this application also takes advantage of the airline running a special fare into a specified market, that is not run into other markets that are very close to that specified market. For example, it may be much cheaper to fly into Tampa, Fla., than it is to fly into Orlando. Orlando is only two hours away from Tampa by car. Similarly, it may be much cheaper to fly into Philadelphia than to Washington D.C. This second mode preferably operates with a binding auction system. In a binding auction system, a user indicates where they want to go and makes an offer of how much they want to pay. They also present payment information such as a credit card.

If the offer is accepted, then the credit card is automatically charged and the ticket is automatically issued. Once is the offer is made, the user has no chance to decline the offer if accepted. The user's offer is binding if accepted.

The airlines have used this technique to sell their surplus tickets. Typically the airlines will not sell the tickets for less than some specified amount. However, this enables the airlines to dispose of seats that remain on any airplane, to sell tickets at less than the published price. This does not change the published fare base, since the sale of the specified ticket may not qualify as not a published fare.

Figure 3:
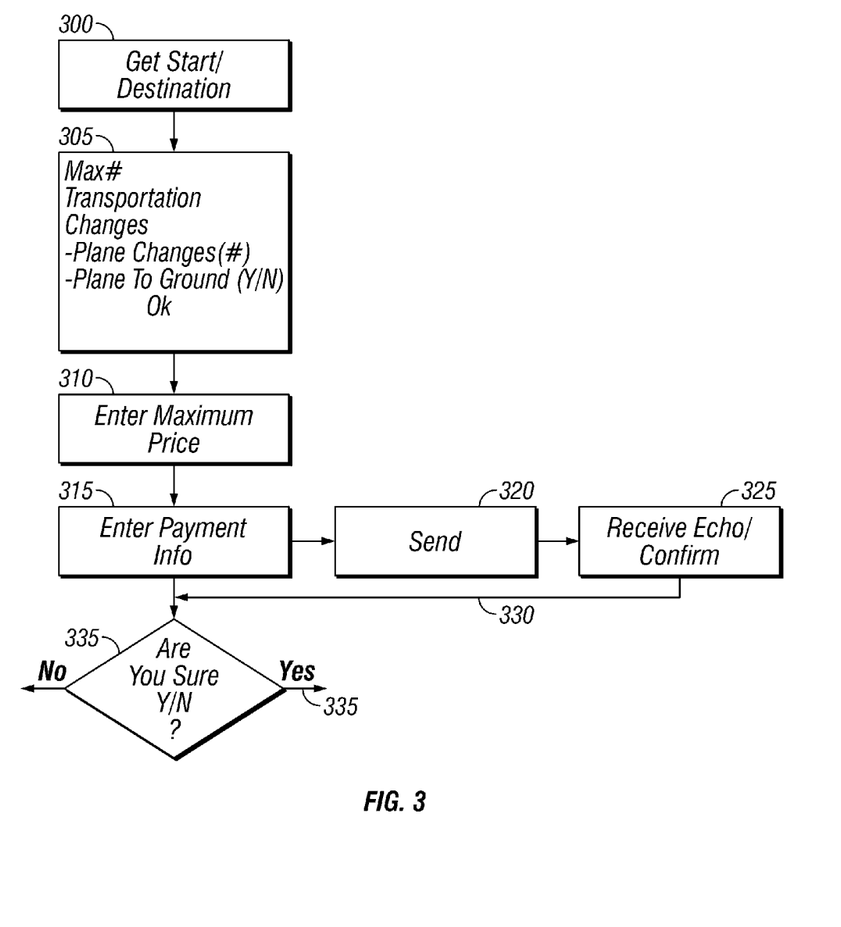
FIG. 3 shows a flowchart of another embodiment.

According to this model, even further flexibility in the system is provided. The present model provides a package of more then one travel item into a binding fare package. The binding fare model operates as follows and as shown in FIG. 3.

The user signifies their desire to travel from a starting point, e.g. Washington D.C., to a destination point for example San Diego. This selecting can use the FIG. 1 user interface. The information is obtained in the server as shown in 300. At 305, the user specifies the maximum number of transportation changes that are allowable. Each time the user needs to leave their seat and enter a new vehicle comprises one transportation change. So, for example, changing planes can constitute one transportation change, and going from plane to bus can constitute another transportation change. The user also gets the option of indicating, for example, how many plane changes they will accept, and whether they will accept a transfer on ground transportation, e.g. from train to bus. The user enters a maximum price they are willing to pay for the trip at step 310. Payment information is entered at 315. At step 325 the server echoes the information, and sends it back at 330. The user is asked, "Are you sure that you want to do this? " at 335 If so, the information is transmitted again at 335. Once the user accepts the information, they become obligated to take the trip if the trip can be found for that price.

The server operates using a similar model to the other binding offer systems. However, the operation proceeds with additional variables. Each geographic location is broken down into not only that location, but also other locations which can be accessed via ground transportation for example. Therefore, the system may check flights into Philadelphia as well as checking flights into the Washington D.C. area. If a flight into Philadelphia is found the generally meets the price parameters, the system checks ground transportation options to see if it can package a flight option with a ground transportation option. If so, the combination is booked, and the credit card is automatically charged for the combination.

Figure 4:
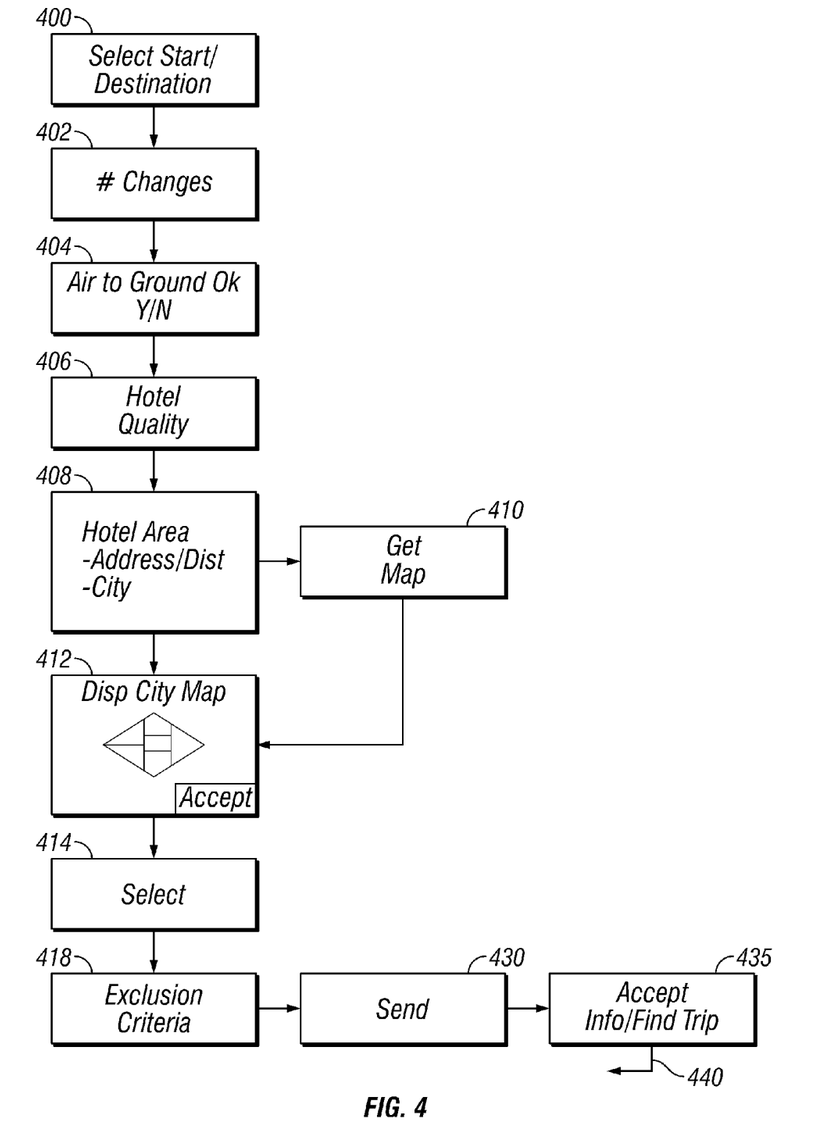
FIG. 4 shows a flowchart of other operations.

FIG. 4 shows an alternative of the above which carries out the same multiple-operation-packaging system for use with airlines and hotels. The user decides what they want to pay not only for the transport, but also for their lodging during the trip. The user selects the criteria, including the start/destination at 400 number of stops and changes 402, if air to ground is ok 404, and the quality of hotel at 406. For example, the quality of hotel can be selected by the number of stars. Locations of the hotel are selected at 405. One way of selecting this may be to enter an address, and specify a radius around that address in which they will accept the hotel. Another way of specifying the desired hotel is to enter the city at 408. The server responds at 410 by displaying a map to the user at step 520. The user selects various neighborhoods 414 on the map. Each selection changes a color of the selected area. In this way the user can select a number of different areas.

In this system, the user is also given an option to exclude certain things. For example, user's idiosyncrasy based on good and bad experiences may play into what they are willing to do. For example a user may not be willing to stay in a Holiday Inn. Step 418 specifies entering exclusion criteria. The exclusion criteria can be any word in the name of the hotel, can be a specified hotel chain, or other. The returned and booked trip will therefore only be acceptable if it does not include this exclusion criteria.

When all information is finished the user can actuate the accept button to accept all the different alternatives and send that information to the server at 430.

The server accepts this information at 435, and attempts to find a package meeting the criteria. It if does, a package is returned at 440. If not, a decline or counter offer is returned at 440.

Other embodiments are contemplated.

What is claimed is:

1. A system comprising:
a server computer having travel information;
a client computer, having a cursor moving element, and an actuator that is actuated to select a current position of said cursor moving element, said client computer connected to said server computer over a network, and running a server interfacing program, which exchanges information with said server, said server interfacing program operating to produce a graphical user interface that allows entry of a desired starting area for travel, and a desired ending area for said travel, said graphical user interface displaying a map of an area within which the travel will occur, and allowing said starting area for said travel to be selected within said area by using said cursor moving element to place a cursor of the graphical user interface over said starting area, and actuating said actuator to select said starting area, and allowing said ending area for said travel to be selected by using said cursor moving element to place the cursor of the graphical user interface over said ending area, and actuating the actuator to indicate said end area, said server interfacing program receiving said starting area, and said ending area, sending first travel information about both said starting area and said ending area to said server, and receiving travel information from said server indicative of travel options between the selected starting area and ending area,
wherein said server interfacing program further allows at least one of said starting area or said ending area to be changed in size to form a changed in size area, by using said cursor moving element to change a size of said at least one, and wherein said first travel information includes information about said changed in size area, and said travel information received from said server includes options for different locations within said changed in size area.

2. A system as in claim 1, wherein said server computer produces an image of a line extending between said starting point and said ending point, overlaid on said map.

3. A system as in claim 2, wherein said line includes an indication of a stopping point between said beginning point and said ending point.

4. A system as in claim 1, wherein said starting area and ending area include information about airports within said areas, and said changing size is operative to add or subtract airports within said areas.

5. A system comprising:
a server computer having travel information;
a client computer, having a cursor moving element, and an actuator that is actuated to select a current position of said cursor moving element, said client computer connected to said server computer over a network, and running a server interfacing program, which exchanges information with said server, said server interfacing program operating to produce a graphical user interface that includes a hyperlinked image, that allows entry of a desired starting area for travel, and a desired ending area for said travel by selecting a link on the hyperlinked image, said graphical user interface displaying a map of an area within which the travel will occur, and allowing said starting area for said travel to be selected within said area by using said cursor moving element to place a cursor of the graphical user interface over said starting area selecting a first link on the hyperlinked image, and actuating said actuator to select said starting area, and allowing said ending area for said travel to be selected by using said cursor moving element to place the cursor of the graphical user interface over said ending area, and actuating the actuator to indicate said ending area by selecting a second link on said hyperlinked image, said server interfacing program receiving said starting area, and said ending area, sending first travel information about both said starting area and said ending area to said server, and receiving travel information from said server indicative of travel options between the selected starting area and ending area;
wherein said client computer displays information about a selected trip from said starting area to said ending area, including information about how much the trip deviates compared with an optimum route from said starting area to said ending area.

6. A system as in claim 5, wherein said amount of deviation includes information about travel times of different routes.

7. A system as in claim 5, further comprising a memory storing a travel itinerary on the server computer, and a biometric information entry device at the client computer, which allows entering biometric information that is used to access a stored travel itinerary from the client computer.

8. A system, comprising:
a server computer, storing travel information;
a client computer, having a processor that is programmed to display a graphical user interface, displaying a hyperlinked image including hyperlinks for a plurality of airports which airports can form begin and end points of a trip, said hyperlinked image being based on information from said server computer, and said client computer including a movable element which is movable over said hyperlinked image, and said movable element is actuated to select an area of said hyperlinked image including at least one airport, and said movable element being variable to change a number of said airports which are included within said area, and said movable element permitting selection of said area as said begin and/or end point of the trip.

9. A system as in claim 8, wherein said processor is programmed to display a screen tip based on information from said server computer, said screen tip including additional information, which is additional to the information included on said hyperlinked image, about at least one of said plurality of airports.

10. A system as in claim 8, wherein said processor is operative to determine a matrix of flights between all airports within an area for said begin point and all airports within an area for said end point, where there is more than one airport within at least one of the beginning or end points.

11. A system as in claim 8, wherein said processor is operative to determine an optimal flying route between said begin point and said end point, and display an actual selected flying route relative to said optimal flying route.

12. A system as in claim 11, wherein said processor is further operative to determine a deviation between the optimal flying route and said selected flying route.

13. A system as in claim 8, further comprising a biometric information reader associated with said client computer, wherein said processor controls said client computer controls obtaining said biometric information, and said server computer stores travel information about individuals that is associated with biometric information about the individuals, and returns said travel information to said client computer based on biometric information sent from said client computer.

14. A system as in claim 8, further comprising allowing a user to make a binding offer, including payment information, for any of plural airline routes between any of said begin points, and any of said end points, where there are more than one airport within at least one of the beginning points or end points.

* * * * *